United States Patent
Peuranen et al.

(10) Patent No.: US 9,212,247 B2
(45) Date of Patent: Dec. 15, 2015

(54) METHOD FOR CONTROLLING SIZE DISTRIBUTION OF POLYMER PARTICLES DURING PREPARATION OF AQUEOUS POLYMER DISPERSION AND AQUEOUS POLYMER DISPERSION

(71) Applicant: Kemira Oyj, Helsinki (FI)

(72) Inventors: Helena Peuranen, Espoo (FI); Perttu Heiska, Espoo (FI); Kimmo Huhtala, Turku (FI); Nina Bruun, Turku (FI)

(73) Assignee: Kemira Oyj, Helsinki (FI)

( * ) Notice: Subject to any disclaimer, the term of this patent is extended or adjusted under 35 U.S.C. 154(b) by 0 days.

(21) Appl. No.: 14/510,200

(22) Filed: Oct. 9, 2014

(65) Prior Publication Data

US 2015/0025194 A1    Jan. 22, 2015

Related U.S. Application Data

(62) Division of application No. 13/739,071, filed on Jan. 11, 2013.

(60) Provisional application No. 61/585,677, filed on Jan. 12, 2012.

(30) Foreign Application Priority Data

Jan. 12, 2012   (FI) ..................................... 20125036

(51) Int. Cl.

| | | |
|---|---|---|
| C08L 1/00 | (2006.01) | |
| C08L 31/00 | (2006.01) | |
| C08F 251/00 | (2006.01) | |
| C08F 2/16 | (2006.01) | |
| C08F 212/08 | (2006.01) | |
| D21H 21/16 | (2006.01) | |
| C08F 2/20 | (2006.01) | |
| D21H 17/24 | (2006.01) | |
| D21H 17/36 | (2006.01) | |
| D21H 17/37 | (2006.01) | |
| C08F 220/18 | (2006.01) | |
| C08K 3/20 | (2006.01) | |

(52) U.S. Cl.

CPC ................. *C08F 251/00* (2013.01); *C08F 2/16* (2013.01); *C08F 2/20* (2013.01); *C08F 212/08* (2013.01); *C08F 220/18* (2013.01); *C08K 3/20* (2013.01); *D21H 17/24* (2013.01); *D21H 17/36* (2013.01); *D21H 17/37* (2013.01); *D21H 21/16* (2013.01)

(58) Field of Classification Search

CPC .................................. C08F 251/00; C08K 3/20
USPC ............................................................. 524/35
See application file for complete search history.

(56) References Cited

U.S. PATENT DOCUMENTS

| | | | |
|---|---|---|---|
| 6,114,417 A | | 9/2000 | O'Toole et al. |
| 6,426,381 B1 * | | 7/2002 | Konig et al. .................. 524/734 |
| 2009/0139675 A1 | | 6/2009 | Stein et al. |
| 2011/0071228 A1 | | 3/2011 | Kijlstra et al. |
| 2012/0180970 A1 | | 7/2012 | Song et al. |

FOREIGN PATENT DOCUMENTS

| | | |
|---|---|---|
| EP | 1321574 | 6/2003 |
| WO | 0157173 | 8/2001 |
| WO | 2009141109 | 11/2009 |
| WO | 2011039185 A2 | 4/2011 |

OTHER PUBLICATIONS

International Search Report of May 3, 2013 for PCT/FI2013/050031, 3 pages.
Finnish Search Report for Application No. 20125036.

* cited by examiner

*Primary Examiner* — Hui Chin
(74) *Attorney, Agent, or Firm* — Thomas Horstemeyer, LLP

(57) ABSTRACT

The present disclosure relates to a method for controlling size distribution of formed polymer particles during preparation of aqueous polymer dispersion. The method comprises obtaining an aqueous polysaccharide solution, which comprises about 10 to 40 weight-% polysaccharide containing a free hydroxyl group, such as starch, and polymerising in the polysaccharide solution in the presence of a graft-linking, water-soluble redox system about 30 to 60 weight-% of at least one optionally substituted styrene, about 60 to 30 weight-% of at least one C1-C4-alkyl(meth)acrylate, and 0 to about 10 weight-% of other ethylenically unsaturated copolymerizable monomers. The size distribution of the formed polymer particles is controlled by adjusting viscosity of the polysaccharide solution before the polymerisation to a level less than about 20 mPas.

11 Claims, No Drawings

METHOD FOR CONTROLLING SIZE DISTRIBUTION OF POLYMER PARTICLES DURING PREPARATION OF AQUEOUS POLYMER DISPERSION AND AQUEOUS POLYMER DISPERSION

CROSS REFERENCE TO RELATED APPLICATION

This application is a divisional of and claims priority to application Ser. No. 13/739,071, filed Jan. 11, 2013, entitled "Method for Controlling Size Distribution of Polymer Particles During Preparation of Aqueous Polymer Dispersion, Aqueous Polymer Dispersion and Its Use", which claims priority to co-pending Finnish patent application entitled "Method for Controlling Size Distribution of Polymer Particles During Preparation of Aqueous Polymer Dispersion, Aqueous Polymer Dispersion and Its Use" having Serial No. 20125036, filed on Jan. 12, 2012, which claims priority to U.S. provisional application entitled "Method for Controlling Size Distribution of Polymer Particles During Preparation of Aqueous Polymer Dispersion, Aqueous Polymer Dispersion and Its Use" having Ser. No. 61/585,677, filed on Jan. 12, 2012, which is entirely incorporated herein by reference.

FIELD OF THE DISCLOSURE

The present disclosure relates to methods for controlling size distribution of polymer particles during preparation of aqueous polymer dispersion and aqueous polymer dispersion according to the preambles of the enclosed claims.

BACKGROUND

Starch graft copolymer dispersions are used in pulp and papermaking. They can be used for various purposes, for example for surface sizing compositions or for increasing the dry strength of paper. For example, U.S. Pat. No. 6,426,381 discloses styrene/(meth)acrylate copolymers that can be used for surface sizing. U.S. Pat. No. 6,426,381 further discloses that the obtained dispersions have a particle size of less than 100 nm, even 50 to 90 nm. In practice, however, it has been observed that even if most of the formed polymer particles in the aqueous dispersion are relatively small, there exist also an amount of large polymer particles or polymer agglomerates. This fact is demonstrated by observing a typical particle size distribution for these polymer dispersions. For a dispersion having D(50) value less than 100 nm, D(90) value may already be around 130 nm, and D(99) value around 400 nm. This indicates clearly the presence of large polymer particles or polymer agglomerates.

Uneven particle size distribution in the aqueous dispersion may have negative effects in the end use of the polymer dispersions in papermaking applications. Furthermore, it has been observed that small particle size offers advantages in many applications. Therefore, there exists an interest to prepare polymer dispersions comprising small and even sized particles.

SUMMARY

An object of this disclosure is to minimise or even eliminate the disadvantages existing in the prior art.

An object is also to provide a method(s), with which the occurrence or formation of large polymer particles or polymer agglomerates may be eliminated or reduced in the dispersion.

A further object of this disclosure is to provide a method(s), with which the particle size of the polymer particles may be adjusted.

A still further object of this disclosure is to provide an aqueous polymer dispersion having a small particle size and a negligible amount of large particles or agglomerates.

These objects are attained with a method(s) and an arrangement having the characteristics presented below in the characterizing parts of the independent claims.

DETAILED DESCRIPTION

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, synthetic organic chemistry, paper chemistry, and the like, which are within the skill of the art. Such techniques are explained fully in the literature.

The examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms and phrases that shall be defined to have the following meanings unless a contrary intention is apparent.

Discussion

Typical methods according to the present disclosure for controlling size distribution of formed polymer particles during preparation of aqueous polymer dispersion, comprises
obtaining an aqueous polysaccharide solution, which comprises
(a) about 10 to 40 weight-% of polysaccharide, which contains a free hydroxyl group, such as starch,
polymerising, in the polysaccharide solution and in the presence of a graft-linking water-soluble redox system,
(b) about 30 to 60 weight-% of at least one optionally substituted styrene,
(c) about 60 to 30 weight-% of at least one C1-C4-alkyl (meth)acrylate,
(d) 0 to about 10 weight-% of other ethylenically unsaturated copolymerizable monomers,
wherein the sum of (a)+(b)+(c)+(d) is 100%, and
whereby the size distribution of the formed polymer particles is controlled by adjusting viscosity of the polysaccharide solution before the polymerisation to a level of less than about 20 mPas, measured at about 23° C. with Brookfield LVDV viscometer with spindle 18, 60 rpm.

Typical aqueous polymer dispersion according to the present disclosure is obtained by free radical emulsion copolymerization of ethylenically unsaturated monomers in the presence of
(a) about 10 to 40 weight-% polysaccharide, which contains a free hydroxyl group, such as starch,
the monomers comprising
(b) about 30 to 60 weight-% of at least one optionally substituted styrene,
(c) about 60 to 30 weight-% of at least one C1-C4-alkyl (meth)acrylate, and
(d) 0 to about 10 weight-% of other ethylenically unsaturated copolymerizable monomers,
and using (e) a graft-linking, water-soluble redox system as free radical initiator for the free radical emulsion copolymerization,
wherein the sum (a)+(b)+(c)+(d) is 100%, and
whereby the particle size D(99) value is less than about 160 nm for polymer particles of the polymer dispersion.

Typical use of the aqueous polymer dispersion according to present disclosure is for preparation of compositions used in making of paper, board or the like.

Now it has been surprisingly found out that adjusting the viscosity of the polysaccharide solution before the polymerisation to a level less than about 20 mPas, the formed polymer particles are small in size and their particle size distribution is narrow. It has been observed that the large particles or agglomerates are in practice missing from the obtained dispersion. Small polymer particles with narrow size distribution offer unexpected advantages. For example, it is possible to obtain polymer dispersion with high solids content which still has good, or at least acceptable, viscosity properties. Furthermore, it has been observed that the narrow particle size distribution enhances the function of the polymer dispersion in many papermaking applications, for example as a strength agent.

The viscosity of the polysaccharide solution, such as starch solution, before the polymerisation, i.e. before the addition of the monomers to the starch solution, is adjusted typically to a level less than about 15 mPas, preferably less than about 10 mPas, measured at about 23° C. with Brookfield LVDV viscometer with spindle 18, 60 rpm. The viscosity of the polysaccharide solution, such as starch solution, before the polymerisation may be adjusted typically to the range of about 5-20 mPas, preferably about 5-15 mPas, more preferably about 6-10 mPas, measured at about 23° C. with Brookfield LVDV viscometer with spindle 18, 60 rpm.

According to one embodiment of the disclosure, the viscosity of the polysaccharide solution, such as starch solution, may be adjusted before the polymerisation to the range of about 5-20 mPas, preferably about 8-15 mPas, at about 15% solids content, measured at about 23° C. with Brookfield LVDV viscometer with spindle 18, 60 rpm.

According to one embodiment of the disclosure, the viscosity adjustment of the polysaccharide solution, such as starch solution, is performed by adjusting the pH of the polysaccharide solution less than about 2.5, preferably less than about 2.3 before the polymerisation. This means that the polymerisation is carried out at pH values less than about 2.5, by adjusting the pH of the polysaccharide solution typically to the acidic range of about 1.3-2.4, preferably about 1.5-2.3, more preferably about 1.7-2.1. The pH value may be adjusted to the desired value before the beginning of the polymerisation by using conventional mineral acids or organic acids, such as hydrochloric acid, sulphuric acid, phosphoric acid, formic acid or acetic acid, preferably sulphuric acid.

According to another embodiment of the present disclosure the viscosity adjustment of the polysaccharide solution, such as starch solution, is performed by adjusting the dry solids content of the polysaccharide solution to less than about 35 weight-%, preferably less than about 30 weight-%, more preferably less than about 25 weight-%, before the polymerisation. The dry solids content of the polysaccharide solution is typically adjusted to the range of about 15-35 weight-%, more typically about 15-30 weight %, preferably about 20-25 weight-%, before the polymerisation.

In the present disclosure it is possible to use a polysaccharide, which contains a free hydroxyl group, such as starch. According to one embodiment of the disclosure the polysaccharide containing a free hydroxyl group may be selected from amylose, amylopectine, carrageen, cellulose, chitosan, chitin, dextrines, guar gum (guarane) and other galactomannans, arabic gum, hemicellulose components, and pullulan, preferably from amylose, amylopectine, dextrin and galactomannas. Amylose and amylopectine are being most preferred.

According to another embodiment of the disclosure, polysaccharide, which is used, may preferably be modified or unmodified starch. Starch, which may be used in the present disclosure, may be any suitable natural starch, such as potato, rice, corn, waxy corn, wheat, barley or tapioca starch, potato starch being preferred. Starches having an amylopectin content greater than about 80%, preferably greater than about 95% are advantageous. Starch may be also modified, for example, anionised, cationised and/or degraded. Anionised starch comprises anionic groups, such as carboxylate or phosphate groups, whereas cationised starch comprises cationic groups, such as quaternized ammonium groups. Degree of substitution (DS), indicating the number of anionic/cationic groups in the starch on average per glucose unit, is typically about 0.01-0.20. Amphoteric starches, comprising both anionic and cationic groups, may also be used. It is also possible to use chemically modified starches, such as hydroxyethyl- or hydroxypropyl-starches.

Polysaccharide, such as starch, may be degraded by using suitable oxidising agents, such as hypochlorite and/or hydrogen peroxide, before the polymerisation. According to one advantageous embodiment starch is degraded with hypochlorite for improving the dissolution properties of the starch, and after that a further degradation, for example with hydrogen peroxide, is carried out, e.g. shortly before the subsequent graft copolymerisation. In this case, hydrogen peroxide (calculated as 100%) is used in concentrations of about 0.3 to 5.0 weight-%, based on starch employed. The exact amount of hydrogen peroxide depends on the molecular weight to which the starch is to be degraded.

According to one embodiment of the disclosure the polysaccharide is degraded starch, which is used in the polymerisation process. Degraded starch is obtained by subjecting the starch to oxidative, thermal, acidic, hydrolytic or enzymatic degradation, oxidative degradation being preferred. Hypochlorite, peroxodisulphate, hydrogen peroxide or their mixtures may be used as oxidising agents. Degraded starch has typically an average molecular weight (Mn) 500-10 000, which can be determined by known gel chromatography methods. The intrinsic viscosity is typically about 0.05 to 0.12 dl/g, determined, for example, by known viscosimetric methods, described for example in "Methods in Carbohydrate Chemistry"; Volume IV, Academic Press New York and Frankfurt, 1964, page 127, which is incorporated herein by reference.

Furthermore, starches for which both modification steps have been combined, i.e. which have been degraded and additionally modified, are suitable.

The viscosity adjustment may be performed by selecting a polysaccharide, which is starch or dextrin. According to one preferred embodiment of the disclosure, the viscosity adjustment of the polysaccharide solution is performed by selecting a polysaccharide, which is an anionic starch derivative, preferably anionic potato starch derivative, having a viscosity of less than about 10 mPas, preferably less than about 8 mPas, at about 15% solids content, measured at about 80° C. with Brookfield LVDV viscometer with spindle 18, 60 rpm.

According to one preferred embodiment of the present disclosure, it is thus possible to control the particle size distribution during preparation of aqueous polymer distribution by adjusting the viscosity of the polysaccharide solution, such as starch solution, before the polymerisation, i.e. before the addition of the monomers to the polysaccharide solution. The viscosity adjustment may be performed by optimising and adjusting, as described above, at least one or several or all of the following parameters: pH of the polysaccharide solution, dry solids content of the polysaccharide solution and/or polysaccharide type. By combination of these three parameters it is possible not only to obtain a polymer dispersion with very narrow particle size distribution, but also a polymer dispersion with very small particles. Typical polymer dispersion obtained by the present method has D(50) value less than about 70 nm, preferably less than about 65 nm, more preferably less than about 60 nm, and/or D(99) value less than about 160 nm, preferably less than about 150 nm, more preferably less than about 130 nm, sometimes even less than about 120 nm. Typical polymer dispersion obtained by the method has D(50) value in the range of about 45-70 nm, preferably about 45-60 nm, more preferably about 45-55 nm, sometimes even about 45-50 nm. Typical polymer dispersion obtained by the method has D(99) value in the range of about 100-160 nm, preferably about 110-140 nm, more preferably about 115-135 nm. All the particle sizes are measured by using Zetasizer Nano ZS, Malvern. D(50) and D(99) values refer to the respective values for $50^{th}$ and $99^{th}$ percentile of a volume based distribution.

The polymerisation is carried out by addition of the monomers, which are more closely described below, either individually or as a mixture, and the free radical initiators suitable for initiating the polymerisation of the monomers in the aqueous starch solution with viscosity less than about 20 mPas. The polymerisation process is typically carried in the absence of oxygen, preferably in an inert gas atmosphere, for example under nitrogen.

In case a starch solution is used, it may be heated to a value above its glutenization temperature before the start of the polymerisation. Typically the polymerisation steps of the polymerisation process are performed at a temperature range of about 30-100° C., preferably between about 70-95° C. The temperature may be greater than about 100° C. in case a pressure reactor under superatmospheric pressure is employed. The polymerisation may be carried out by a feed process or by a batch process. A continuous polymerisation process in a stirred kettle cascade or a flow tube is also possible. In a feed process, which is preferred, the monomers and the free radical initiator are metered uniformly into the starch solution in a stirred reactor. During the entire preparation and polymerisation process, thorough mixing with the aid of any suitable stirring or mixing units so that the added components are homogeneously distributed as rapidly as possible.

Initiators used for the polymerisation are in conventional free radical initiators, preferably peroxo or azo compounds. Examples of these are hydrogen peroxide, sodium, potassium and ammonium peroxodisulphate, di-tert-butyl peroxide, dibenzoyl peroxide, azobisisobutyronitrile, 2,2'-azobis(2-methylbutyronitrile), 2,2'-azobis(2,4-dimethylvaleronitrile) and 2,2'-azobis(2-amidinopropane)dihydrochloride. Preferably the initiators are water-soluble, i.e. have a water solubility of greater than about 1 weight-% at about 23° C. Hydrogen peroxide, potassium peroxodisulphate and ammonium peroxodisulphate are advantageous.

Above described free radical initiators may also be used in the presence of conventional reducing agents, thus forming a so-called redox initiator system, which is suitable to be used as initiator. Examples of conventional reducing agents are e.g., sodium sulphite, sodium bisulphite, sodium pyrosulphite, sodium hydrogen sulphite, sodium dithionite, sodium formaldehyde sulphoxylate, ascorbic acid and the sodium salt of hydroxymethanesulphinic acid.

The free radical initiators, especially hydrogen peroxide, may also be combined with heavy metal salts, such as cerium (IV), manganese or iron(II) salts to give a redox system suitable to be used as a water-soluble initiator system providing high grafting yield. According to one embodiment of the disclosure, the use of a combination of hydrogen peroxide and iron(II) salt as the graft-linking, water-soluble redox system is particularly preferred. The grafting yield is here understood the proportion of the polymer which is chemically coupled to the polysaccharide, such as starch, after the end of polymerisation.

The polymerisation may be carried out so that the heavy metal salt of the redox system, e.g. the iron(II) salt, is added to the polysaccharide solution, such as starch solution, before the polymerisation, while hydrogen peroxide is added in simultaneously but separately with the monomers. According to one embodiment of the disclosure, iron(II) salt is usually used in a concentration of about 3-200 mg/l Fe(II) ion, preferably about 5-45 mg/l Fe(II) ion, more preferably about 8-18 mg/l Fe(II) ion, based on the total dispersion. Preferably the amount of iron(II) is as small as possible in order to avoid color problems in final dispersion and prepared paper. Hydrogen peroxide, calculated as 100%, is added in concentrations of about 0.2 to 2.0 weight-%, based on monomers. This amount is additional to the amount of hydrogen peroxide which is optionally used for the polysaccharide, such as starch, degradation.

Ternary initiator systems comprising free radical initiator, reducing agent and heavy metal salt are also suitable for polymerisation. Reducing agent is preferably initially introduced together with iron(II) salt before the polymerisation.

After the end of the addition of the monomers and the initiator, the reaction mixture is usually allowed to continue reacting for some time in order to complete the polymerization. The reaction times typically are between about 0.5 and 10 hours, preferably between about 0.75 and 4 hours. After this subsequent reaction time, a certain amount of initiator may be added again in order to polymerise as substantially as possible the residual monomers still present in the reaction mixture.

The pH of the resulting polymer dispersion may be adjusted after the polymerisation by adding suitable bases, such as alkali metal hydroxides and alkali metal acetates, preferably sodium hydroxide solution, potassium hydroxide solution or ammonia. A pH value in the range of about 4-7 is preferably established thereby. Furthermore, buffer substances may also be added in order to stabilize the pH over the storage time.

Anionic or non-ionic low molecular weight emulsifiers, such as sodium alkanesulphonate, sodium dodecylsulphate, sodium dodecylbenzenesulphonate, sulphosuccinic esters, fatty alcohol polyglycol ethers, alkylaryl polyglycol ethers, etc., may be used in the polymerisation in order to improve the dispersing effect, but the polymerisation is therefore carried out in the absence of emulsifiers. Thus the polymerisation is advantageously free from emulsifiers.

The molecular weight of obtained grafted-on polymer may further be adjusted by the concomitant use of chain-transfer agents or regulators, such as n-dodecyl mercaptan, tert-dodecyl mercaptan, n-butyl mercaptan, tert-butyl mercaptan, etc.

Suitable styrene monomers of group (b) are styrene and substituted styrenes, such as α-methylstyrene or vinyltoluene or their mixtures, Suitable C1-C4-alkyl(meth)acrylate monomers of group (c) are C1-C4-alkyl acrylates, C1-C4-alkyl methacrylates or their mixtures, e.g. n-butyl, iso-butyl, tert-butyl or 2-butyl acrylate and the corresponding butyl methacrylates; methyl acrylate, methyl methacrylate, ethyl acrylate, ethyl methacrylate, propyl acrylate or propyl methacrylate. According to one preferred embodiment of the disclosure, the monomer component (c) is a mixture of at least two isomeric butyl acrylates. More preferably, the monomer component (c) is a mixture of n-butyl acrylate and methyl methacrylate or a mixture of n-butyl acrylate and tert-butyl acrylate. For mixtures of two monomers the mixing ratio may be about 10:90 to 90:10.

Suitable other ethylenically unsaturated copolymerizable monomers of group (d) are ethylhexyl acrylate, stearyl acrylate, stearyl methacrylate, esters of acrylic and methacrylic acid with alcohols which have more than four C atoms, and further acrylonitrile, methacrylonitrile, acrylamide, vinyl acetate or anionic comonomers, such as acrylic acid, methacrylic acid, styrene sulphonic acid. Acrylic acid and styrene sulphonic acid are preferred.

The weight-% of all components (a) to (d) relate to the total solids content of the dispersion, i.e. the sum of the weight amounts of components (a) to (d).

The concentration, i.e. dry solids content, of the obtained polymer dispersion according to the disclosure is typically greater than about 30 weight-%, more typically greater than about 35%, preferably about 35-50 weight-%, more preferably about 35-45 weight-%, based on the weight of the total dispersion. In one embodiment of the disclosure the concentration of the polymer dispersion may be even greater than about 50 weight-%.

According to one embodiment of the disclosure, the viscosity of the polymer dispersion at about 37% solids content is typically less than about 50 mPas, more typically less than about 25 mPas, measured at about 23° C. with Brookfield LVDV viscometer with spindle 18, 60 rpm. Preferably, the viscosity of the polymer dispersion at about 37% solids content is about 10-45 mPas, more preferably about 15-25 mPas, measured at about 23° C. with Brookfield LVDV viscometer with spindle 18, 60 rpm.

In order to increase the shelf-life of the resulting polymer solutions, a biocide may be added, for example, at the end of the preparation process in order to achieve effective protection from fungal and bacterial attack. Biocides based on isothiazolinones or benzoisothiazolinones, or formaldehyde-donating biocides, are preferably added for this purpose. It is also possible to bind the heavy metal ions used in the redox system after the polymerisation by suitable complexing agents, such as ethylenediaminetetraacetic acid, nitrilotriacetic acid, diethylenetriaminepentaacetic acid, polyaspartic acid, iminodisuccinic acid, citric acid or their salts. Complexing agents may be used in concentrations of about 1-10 mol, preferably about 1.1-5 mol, per mol of heavy metal ion.

According to one embodiment of the disclosure, the aqueous polymer dispersion may be used in surface sizing compositions, optionally together with about 5-20 weight-% of starch and optional pigments and/or optical brighteners.

According to another embodiment of the disclosure, the aqueous polymer dispersion may be used as dry strength agent. It may be applied to the pulp prior the sheet formation or it may be applied on the surface of the formed paper web. According to still another embodiment of the disclosure, the aqueous polymer dispersion may be used as wet end strength additive.

EXAMPLES

The following non-limiting examples illustrate some embodiments of the present disclosure.

Reference Example 1

84.2 g of an oxidatively degraded potato starch (Perfectamyl® A4692) is dispersed with stirring in 463 g of demineralised water in a 2-l three-necked flask having a reflux condenser. The starch is dissolved by heating to 95° C., and 5.1 g of a 1% strength aqueous solution of $FeSO_4.7H_2O$ and 3.5 g of 35% strength hydrogen peroxide are added in succession. After 15 min, the starch degradation is complete. The pH is at this point 4.1, adjusted with sulfuric acid, and the viscosity 24.1 mPas. The separate feed of the monomers and the initiator in the course of 90 min is then started at 95° C.

Solution 1: 124.6 g of styrene, 62.3 g of n-butyl acrylate, 62.3 g of tert-butyl acrylate.

Solution 2: 6.3 g of hydrogen peroxide (35% strength) and 42.2 g of water.

15 min after the end of the metering, after cooling the reactor to 60° C., a further 0.7 g of tert-butyl hydroperoxide is added for subsequent activation and stirring is carried out for a further 60 min.

Thereafter, cooling is affected to room temperature, filtration is performed with a 1.2 μm syringe filter, and the pH is adjusted to 6.5 with a sodium hydroxide solution (10% strength).

A fine-particle polymer dispersion having a solids content of 36.6% is obtained, with a particle size and viscosity as listed in Table 1.

Example 2

56.9 g of an oxidatively degraded potato starch (Perfectamyl® A4692) is dispersed with stirring in 593 g of demineralized water in a 1-l three-necked flask having a reflux condenser. The starch is dissolved by heating to 95° C., and 3.5 g of a 1% strength aqueous solution of $FeSO_4.7H_2O$ and 2.4 g of 35. % strength hydrogen peroxide are added in succession. After 15 min, the starch degradation is complete. The pH is at this point 2.5, adjusted with sulfuric acid, and the viscosity 5.1 mPas. The separate feed of the monomers and the initiator in the course of 180 min is then started at 95° C.

Solution 1: 84.3 g of styrene, 42.1 g of n-butyl acrylate, 42.1 g of tert-butyl acrylate.

Solution 2: 4.2 g of hydrogen peroxide (35. % strength) and 28.5 g of water.

15 min after the end of the metering, after cooling the reactor to 60° C., a further 0.5 g of tert-butyl hydroperoxide is added for subsequent activation and stirring is carried out for a further 60 min.

Thereafter, cooling is affected to room temperature, filtration is performed with a 1.2 μm syringe filter and the pH is adjusted to 6.5 with a sodium hydroxide solution (10% strength).

A fine-particled polymer dispersion having a solids content of 24.6% is obtained, with a particle size and viscosity as listed in Table 1.

Example 3

84.2 g of an oxidatively degraded potato starch (Perfectamyl® A4692) is dispersed with stirring in 463 g of demineralized water in a 1-l three-necked flask having a reflux condenser. The starch is dissolved by heating to 95° C., and 5.1 g of a 1% strength aqueous solution of $FeSO_4.7H_2O$ and 3.5 g of 35% strength hydrogen peroxide are added in succession. After 15 min, the starch degradation is complete. The pH is at this point 2.2, adjusted with sulfuric acid, and the viscosity 8.1 mPas. The separate feed of the monomers and the initiator in the course of 180 min is then started at 95° C.

Solution 1: 124.6 g of styrene, 62.3 g of n-butyl acrylate, 62.3 g of tert-butyl acrylate.

Solution 2: 6.3 g of hydrogen peroxide (35% strength) and 42.2 g of water.

15 min after the end of the metering, after cooling the reactor to 60° C., a further 0.7 g of tert-butyl hydroperoxide is added for subsequent activation and stirring is carried out for a further 60 min.

Thereafter, cooling is affected to room temperature, filtration is performed with a 1.2 μm syringe filter and the pH is adjusted to 6.5 with a sodium hydroxide solution (10% strength).

A fine-particled polymer dispersion having a solids content of 36.3% is obtained, with a particle size and viscosity as listed in Table 1.

Example 4

84.2 g of an oxidatively degraded potato starch (Perfectamyl® A4692) is dispersed with stirring in 463 g of demineralized water in a 1-l three-necked flask having a reflux condenser. The starch is dissolved by heating to 95° C., and 5.1 g of a 1% strength aqueous solution of $FeSO_4.7H_2O$ and 3.5 g of 35% strength hydrogen peroxide are added in succession. After 15 min, the starch degradation is complete. The pH is at this point 1.9, adjusted with sulfuric acid, and the viscosity 6.6 mPas. The separate feed of the monomers and the initiator in the course of 180 min is then started at 95° C.

Solution 1: 124.6 g of styrene, 62.3 g of n-butyl acrylate, 62.3 g of tert-butyl acrylate.

Solution 2: 6.3 g of hydrogen peroxide (35% strength) and 42.2 g of water.

15 min after the end of the metering, after cooling the reactor to 60° C., a further 0.7 g of tert-butyl hydroperoxide is added for subsequent activation and stirring is carried out for a further 60 min.

Thereafter, cooling is affected to room temperature, filtration is performed with a 1.2 μm syringe filter and the pH is adjusted to 6.5 with a sodium hydroxide solution (10% strength).

A fine-particled polymer dispersion having a solids content of 35.6% is obtained, with a particle size and viscosity as listed in Table 1.

Example 5

84.2 g of an oxidatively degraded potato starch (Perfectamyl® LV) is dispersed with stirring in 463 g of demineralized water in a 1-l three-necked flask having a reflux condenser. The starch is dissolved by heating to 95° C., and 5.1 g of a 1% strength aqueous solution of $FeSO_4.7H_2O$ and 3.5 g of 35% strength hydrogen peroxide are added in succession. After 15 min, the starch degradation is complete. The pH is at this point 2.5, adjusted with sulfuric acid, and the viscosity 7.8 mPas. The separate feed of the monomers and the initiator in the course of 180 min is then started at 95° C.

Solution 1: 124.6 g of styrene, 62.3 g of n-butyl acrylate, 62.3 g of tert-butyl acrylate.

Solution 2: 6.3 g of hydrogen peroxide (35% strength) and 42.2 g of water.

15 min after the end of the metering, after cooling the reactor to 60° C., a further 0.7 g of tert-butyl hydroperoxide is added for subsequent activation and stirring is carried out for a further 60 min.

Thereafter, cooling is affected to room temperature, filtration is performed with a 1.2 μm syringe filter and the pH is adjusted to 6.5 with a sodium hydroxide solution (10% strength).

A fine-particled polymer dispersion having a solids content of 36.4% is obtained, with a particle size and viscosity as listed in Table 1.

Example 6

84.2 g of an oxidatively degraded potato starch (Perfectamyl® LV) is dispersed with stirring in 463 g of demineralized water in a 1-l three-necked flask having a reflux condenser. The starch is dissolved by heating to 95° C., and 5.1 g of a 1% strength aqueous solution of $FeSO_4.7H_2O$ and 3.5 g of 35% strength hydrogen peroxide are added in succession. After 15 min, the starch degradation is complete. The pH is at this point 2.0, adjusted with sulfuric acid, and the viscosity 6.8 mPas. The separate feed of the monomers and the initiator in the course of 180 min is then started at 95° C.

Solution 1: 124.6 g of styrene, 62.3 g of n-butyl acrylate, 62.3 g of tert-butyl acrylate.

Solution 2: 6.3 g of hydrogen peroxide (35% strength) and 42.2 g of water.

15 min after the end of the metering, after cooling the reactor to 60° C., a further 0.7 g of tert-butyl hydroperoxide is added for subsequent activation and stirring is carried out for a further 60 min.

Thereafter, cooling is affected to room temperature, filtration is performed with a 1.2 μm syringe filter and the pH is adjusted to 6.5 with a sodium hydroxide solution (10% strength).

A fine-particled polymer dispersion having a solids content of 36.1% is obtained, with a particle size and viscosity as listed in Table 1.

Example 7

84.2 g of a dextrin (Avedex W80) is dispersed with stirring in 463 g of demineralized water in a 2-l three-necked flask having a reflux condenser. The starch is dissolved by heating to 95° C., and 5.1 g of a 1% strength aqueous solution of $FeSO_4 \cdot 7H_2O$ and 3.5 g of 35% strength hydrogen peroxide are added in succession. After 15 min, the starch degradation is complete. The pH is at this point is 2.2 and viscosity 5.0 mPas. The separate feed of the monomers and the initiator in the course of 90 min is the started at 95° C.

Solution 1: 124.6 g of styrene, 62.3 g of n-butyl acrylate, 62.3 g of tert-butyl acrylate.

Solution 2: 6.3 g of hydrogen peroxide (35% strength) and 42.2 g of water.

15 min after the end of the metering, after cooling the reactor to 60° C., a further 0.7 g of tert-butyl hydroperoxide is added for subsequent activation and stirring is carried out for a further 60 min.

Thereafter, cooling is affected to room temperature, filtration is performed with a 1.2 μm syringe filter and the pH is adjusted to 6.5 with a sodium hydroxide solution (10% strength).

A fine-particled polymer dispersion having a solids content of 36.7% is obtained, with a particle size and viscosity as listed in Table 1.

TABLE 1

Results for Examples 1 to 6.

| | Ref. Ex. 1 | Ex. 2 | Ex. 3 | Ex. 4 | Ex. 5 | Ex. 6 | Ex. 7 |
|---|---|---|---|---|---|---|---|
| Solids, % | 36.6 | 24.6 | 36.3 | 35.6 | 36.4 | 36.1 | 36.7 |
| D50, nm | 58 | 52 | 58 | 64 | 65 | 66 | 54 |
| D90, nm | 108 | 82 | 92 | 93 | 102 | 100 | 85 |
| D99, nm | 195 | 119 | 137 | 129 | 147 | 138 | 122 |
| Viscosity, mPas | 46.9 | 6.2 | 19.6 | 11.4 | 22.4 | 15.3 | 5.9 |

D50 = particle size, 50% of particles lower than given value
D90 = particle size, 90% of particles lower than given value
D99 = particle size, 99% of particles lower than given value In all foregoing Examples particle sizes are measured with Zetasizer Nano ZS, Malvern. D50, D90, D99 values refer to the respective values for $50^{th}$, $90^{th}$, $99^{th}$ percentile of a volume based distribution.

In all foregoing Examples viscosity values are measured with Brookfield LVDV viscometer with spindle 18, 60 rpm.

It can be seen from Table 1 that the particle size distribution is clearly narrower when the polymer dispersion is prepared according to the present disclosure.

Even if the disclosure were described with reference to what at present seems to be the most practical and preferred embodiments, it is appreciated that the disclosure shall not be limited to the embodiments described above, but the disclosure is intended to cover also different modifications and equivalent technical solutions within the scope of the enclosed claims.

The invention claimed is:

1. A method for controlling size distribution of formed polymer particles during preparation of an aqueous polymer dispersion, comprising:
   obtaining an aqueous polysaccharide solution, which comprises
      (a) about 10 to 40 weight-% of polysaccharide containing a free hydroxyl group,
   polymerising in the polysaccharide solution in the presence of a graft-linking, water-soluble redox system,
      (b) about 30 to 60 weight-% of at least one optionally substituted styrene,
      (c) about 60 to 30 weight-% of at least one C1-C4-alkyl (meth)acrylate,
      (d) 0 to about 10 weight-% of other ethylenically unsaturated copolymerizable monomers,
   wherein the sum of (a)+(b)+(c)+(d) is 100%,
   wherein the size distribution of the formed polymer particles is controlled by adjusting viscosity of the polysaccharide solution before the polymerisation to a level less than about 20 mPas, measured at about 23° C. with Brookfield LVDV viscometer with spindle 18, 60 rpm.

2. The method according to claim 1, wherein the viscosity of the polysaccharide solution is adjusted before the polymerisation to a level less than about 15 mPas, measured at about 23° C. with Brookfield LVDV viscometer with spindle 18, 60rpm.

3. The method according to claim 1, wherein the viscosity adjustment of the polysaccharide solution is performed by adjusting, before the polymerisation, at least one of the following parameters of the polysaccharide solution: pH of the polysaccharide solution, dry solids content of the polysaccharide solution or starch or dextrin.

4. The method according to claim 3, wherein the viscosity adjustment of the polysaccharide solution is performed by adjusting the pH of the polysaccharide solution to a value less than about 2.5 before the polymerisation.

5. The method according to claim 4, wherein the pH of the polysaccharide solution is adjusted to a range of about 1.3-2.4.

6. The method according to claim 3, wherein the viscosity adjustment of the polysaccharide solution is performed by adjusting the dry solids content of the polysaccharide solution to less than about 35 weight-% before the polymerisation.

7. The method according to claim 6, wherein the dry solids content of the polysaccharide solution is adjusted to a range of about 15-35 weight-%.

8. The method according to claim 3, wherein the viscosity adjustment of the polysaccharide solution is performed by selecting a polysaccharide, wherein the polysaccharide comprises starch or dextrin.

9. The method according to claim 8, wherein the viscosity adjustment of the polysaccharide solution is performed by selecting a polysaccharide, wherein the polysaccharide comprises an anionic starch derivative, having a viscosity of less than about 10 mPas, at about 15% solids content, measured at about 80° C. with Brookfield LVDV viscometer with spindle 18, 60 rpm.

10. The method according to claim 1, wherein a combination of hydrogen peroxide and iron(II) salt as the graft-linking, water-soluble redox system is used.

11. The method according to claim 10, wherein iron(II) salt in a concentration of about 3-200 mg/l Fe(II) ion is used based on the total dispersion.

* * * * *